Figure 1:
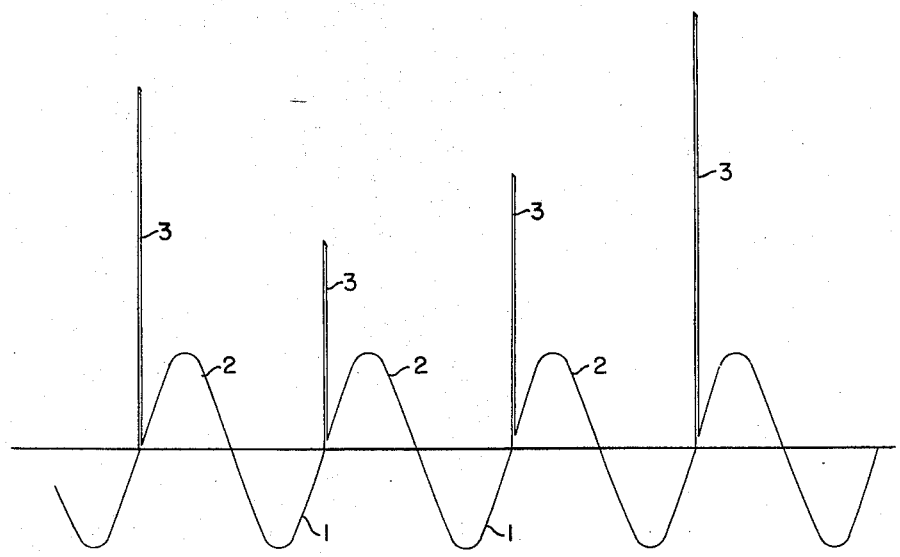

March 9, 1954  R. B. STEELE  2,671,843
ELECTRIC WELDING
Filed June 7, 1950

INVENTOR
RICHARD B. STEELE
BY
ATTORNEYS

Patented Mar. 9, 1954

2,671,843

UNITED STATES PATENT OFFICE 2,671,843

ELECTRIC WELDING

Richard B. Steele, New Providence, N. J., assignor to Air Reduction Company, Incorporated, New York, N. Y., a corporation of New York Application June 7, 1950, Serial No. 166,656

8 Claims. (Cl. 219—8)

This invention relates to automatic arc welding and more particularly to improvements in alternating current welding whereby the electrode is automatically maintained at the desired distance from the workpiece.

In automatic arc welding it is desirable to provide means for adjusting the position of the electrode with respect to the workpiece so that the arc length is maintained substantially constant regardless of changes of contour of the workpiece and regardless of any temporary tendency of the arc length to change.

It has been found that in alternating current welding if an attempt is made to adjust the position of the welding electrode in response to changes in arc voltage, the control or the arc length is unreliable where the control signal or impulse is commensurate with the voltage developed from the arc circuit through a full wave rectifier and suitable filtering devices. I have discovered, however, in inert gas shielded tungsten arc welding, for example, that if the control signal or impulse is made commensurate with the value of the electrode negative half of the arc voltage cycle, this signal or impulse is a most reliable measure of the arc length and capable of effecting accurate adjustment of the electrode to maintain the arc length substantially constant.

The electrode positive half cycles of the arc voltage are not steady or uniform and accordingly it is not feasible to employ means responsive to the positive half cycles or responsive to the full wave rectification for adjusting the arc length. In the latter event the irregularities in the positive half cycle are reflected in the full wave rectification causing undesirable disturbance or irregularity in the control signal or impulse. This phenomenon is due to the fact that as the current changes from electrode negative to electrode positive there is actually an instantaneous interruption in the flow of current with the result that the arc voltage approaches for an instant the open circuit value. These transient voltage impulses are not uniform and accordingly any device that reflects or is responsive to the positive half wave rectification is unreliable because it is influenced by these irregular open circuit voltage surges.

When the current changes from electrode positive to electrode negative, however, there is no such interruption in the flow of current and the negative half cycles thus provide a uniform reliable signal or measure of an electrical condition of the arc during the electrode negative half cycles, which is commensurate with the arc length. If the arc is abnormally long, the value of the rectified negative half waves is greater than when the arc length is normal, and this value is used pursuant to my invention for controlling the adjustment or position of the electrode to maintain the desired substantially constant arc length. If the arc length for any reason becomes too short for efficient operation, this condition is again reflected in an abnormally low value of the rectified negative half waves of arc voltage and the electrode positioning means may be thereby automatically controlled to change the position of the end of the electrode to increase the arc length to the desired normal value.

It is believed that the reason for the dissymmetry of the two halves of the arc voltage cycle, and for the fact that a non-uniform voltage surge occurs across the arc when the current reverses in one direction but not in the other, lies in the fact that one of the elements between which the arc is established emits electrons more readily than the other. As a result the voltage trace on one half of the cycle is more regular than on the other half of the cycle. For example, a hot tungsten electrode emits electrons readily so that the electrode may swing from positive to negative, and the current reverse, without fluctuation or irregular variation in the voltage wave. On the other hand as the electrode swings from negative to positive a much greater potential is required to re-establish the current because of the low electron emissivity of the workpiece. In other arc welding applications the workpiece may be more emissive than the electrode, in which case the electrode positive portion of the voltage wave would provide the most reliable signal. Therefore, by selective rectification of the regular or uniform half of the arc voltage wave a signal may be generated that is a function of the arc length.

In general, the principal objects of this invention may be obtained by employing suitable motor means or the like for adjusting the position of the welding electrode and controlling the operation of this means in response to the electrical condition of the arc during selected stable portions of the arc voltage, as by means of a properly connected half wave rectifier. Suitable filtering devices may be used for supplying to the adjusting means a signal or impulse commensurate with the mean value of the selected half cycles.

Figure 2:
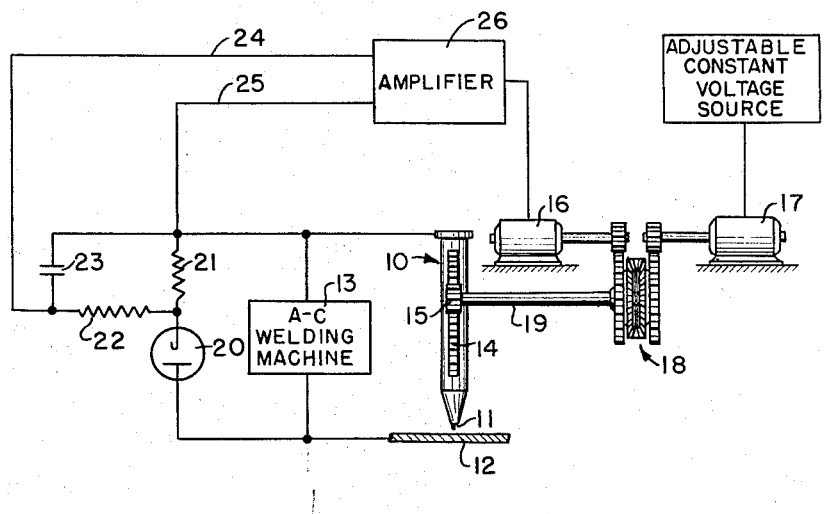

In Fig. 1 of the accompanying drawings, I have illustrated a typical voltage trace for an electrode supplied with alternating welding current and in Fig. 2 I have illustrated in simplified schematic form, a typical alternating current welding apparatus embodying my invention.

Referring particularly to Fig. 1 of the accompanying drawings, representing a typical voltage trace for the electrode of an alternating current welding apparatus, it will be noted that the electrode negative half cycles 1 are all of similar configuration, whereas the electrode positive half cycles 2 are irregular because of the appearance of positive pips 3 of varying magnitude and duration. Fig. 1 thus illustrates the fact that as the potential of the electrode changes from positive to negative there is no discontinuity in the voltage wave, whereas when the electrode potential changes from negative to positive, the normal sine wave is irregularly disturbed. This is because the arc actually goes out momentarily when the welding current passes through zero on the change from electrode negative to electrode positive. Since this is actually an open circuit condition, the electrode voltage tends to increase to near the open circuit value of the welding machine. When the arc is reestablished the voltage returns to its normal closed circuit value. This produces the positive pips 3 that appear on the electrode voltage trace, and inasmuch as these pips are not all alike, they do not reflect the arc length. The electrode negative half cycles 1, however, are uniform and of constant magnitude for any given arc length—increasing in value for increases in arc length, and decreasing in value whenever the arc length decreases for any reason such as a change in the contour of the workpiece or a change in the burn-off rate of the electrode.

The apparatus schematically illustrated in Fig. 2 comprises an electrode holder 10 supporting an electrode 11 in operative relation with respect to a workpiece 12. An alternating current welding machine 13 is connected across the electrode and the workpiece in the usual manner. The electrode holder 10 is shown as having a rack 14 thereon. A gear 15, mounted on a shaft 19, engages the rack to move the holder 10 up and down so that the electrode holder 10 may be adjusted vertically to change the position of the electrode 11 with respect to the workpiece 12. The electrode position adjusting mechanism comprising the gear 15 and the shaft 19 may be actuated by a differential mechanism 18 connected to electric motors 16 and 17. The motors 16 and 17 rotate in opposite directions and accordingly if the rate of rotation is the same, the shaft 19 remains stationary. Whenever the speed of the motor 16 exceeds that of the motor 17, the shaft 19 is caused to rotate in such a direction as to raise the electrode holder 10 and increase the length of the arc. On the other hand, when the speed of the motor 16 is less than that of the motor 17, the shaft 11 rotates in the opposite direction and lowers the electrode holder. The motor 17 may be a constant speed motor with means for adjusting its constant speed, as illustrated in Fig. 2. Motor 16 is a variable speed motor controlled by an electric signal responsive to the electrical condition of the welding arc as hereinafter described.

In Fig. 2 I have illustrated a rectifier in the welding circuit in parallel relation to the welding arc, the rectifier being illustrated as a diode vacuum tube 20 connected to the workpiece 12 and to the electrode 11 through the electrode holder 10. This rectifier tube is connected in the circuit in such a manner that it will only conduct when the electrode is negative and the workpiece positive and accordingly it will be understood that the rectifier transmits a signal that is responsive only to the negative half cycles of the arc voltage. A load resistor 21 is placed in series with the rectifier for the purpose of developing a signal voltage in the rectifier circuit, and this resistor also serves to prevent the rectifier from short circuiting the arc.

The resistor 21 may have a resistance of the order of magnitude of one tenth megohm. The pulsating rectified voltage developed across the load resistor 21 may be modified to an average value by the filter circuit consisting of a resistor 22 and a capacitor 23 so that the resultant voltage which appears between the conductors 24 and 25 provides a signal commensurate with the mean value of the negative half cycles of the arc voltage. This signal voltage may be amplified by amplifier 26 and used to control the speed of rotation of the variable speed motor 16 as schematically illustrated in Fig. 2.

It will be understood that whenever the arc length increases to a value greater than the desired average arc length, the accompanying change in the electrical condition of the arc is substantially instantaneously reflected in a change in the rectified signal transmitted through the rectifier 20 and the filter circuit to the amplifier 26, to cause a decrease in the speed of the motor 16 whereby the electrode position adjusting mechanism including the differential 18, the shaft 19, the gear 15 and the rack 14 on electrode holder 10, lowers the electrode holder to shorten the arc to the desired value. In a like manner any abnormal decrease in arc length is corrected by the rectifier apparatus controlling the motor 16 to increase its speed, thereby raising the electrode holder to increase the arc length to the desired value.

It is to be understood that the manner in which the signal commensurate with the selected half wave is applied to control the arc length may be varied without departing from the spirit of this invention, for it is immaterial what particular electrode position adjusting mechanism is employed as long as it is responsive to changes in the value of the selected half cycles of the arc voltage. For example, while I have illustrated a constant speed motor and a variable speed motor acting through a differential to provide the desired adjustment of the electrode holder, it will be understood that the signal voltage might be fed to a comparator circuit controlling two variable speed motors so that a given change in signal voltage would cause one motor to speed up and the other motor to slow down, and vice versa. Also, the signal voltage might be used to control a single reversing motor, or, in the case of a consuming electrode, to vary the speed of a unidirectional feed motor. In general, my invention contemplates controlling the position of the electrode in response to changes in the value of selected half cycles of the arc voltage, regardless of the specific apparatus employed for adjusting the position of the electrode, and regardless of whether the electrode is a tungsten or other non-consuming electrode, or a consuming electrode. Means responsive to a selected stable portion of the arc voltage acts through appropriate servo means to control the spacing of the electrode from the work.

I claim:

1. Alternating current arc welding apparatus comprising a welding electrode, a welding circuit connected to the electrode and to a workpiece for supplying alternating welding current to maintain the welding arc, means for adjusting the welding position of the electrode with respect to the workpiece, and means responsive to selected stable half cycles of the arc voltage for actuating said adjusting means to maintain the arc length substantially constant.

2. Alternating current arc welding apparatus comprising a welding electrode, a welding circuit connected to the electrode and to a workpiece for supplying alternating current to maintain the welding arc, one of said electrode and workpiece consisting of material which emits electrons substantially more readily than the material of which the other consists, means for adjusting the welding position of the electrode with respect to the workpiece, and means responsive only to the half cycles of the arc voltage during which the one of the electrode and the workpiece which possesses the higher electron emissivity characteristic is negative for actuating said adjusting means to maintain the arc length substantially constant.

3. Alternating current arc welding apparatus comprising a welding electrode, a welding circuit connected to the electrode and to a workpiece for supplying alternating current to maintain the welding arc, one of said electrode and workpiece consisting of material which emits electrons substantially more readily than the material of which the other consists, means for adjusting the welding position of the electrode with respect to the workpiece, a half wave rectifier the cathode of which is connected to the one of said electrode and workpiece which possesses the higher electron emissivity characteristic and the anode of which is connected to the other of said electrode and and workpiece, and means responsive to the rectifier for controlling said adjusting means to maintain the arc length substantially constant.

4. Alternating current arc welding apparatus according to claim 3 in which the electrode is made of tungsten and in which the cathode of the rectifier is connected to the electrode, the anode thereof being connected to the workpiece.

5. Alternating current arc welding apparatus comprising a welding electrode, a welding circuit connected to the electrode and to a workpiece for supplying alternating current to maintain the welding arc, one of said electrode and workpiece consisting of a material which emits electrons substantially more readily than the material of which the other consists, means for varying the spacing of the electrode from the workpiece to vary the arc length in response to an electric signal, and means for producing said electric signal comprising an impedance connected in parallel with the arc and a rectifier in series with said impedance to produce a unidirectional signal voltage across said impedance, said rectifier being connected to conduct when the higher electron emissive element is negative.

6. Alternating current arc welding apparatus according to claim 5 in which the impedance is a resistance and which includes a filter circuit connected across said resistance.

7. Alternating current arc welding apparatus according to claim 5 in which the electrode is tungsten and the workpiece is a common structural metal.

8. The method of regulating the length of an alternating current welding arc formed between an electrode and a workpiece, one of which emits electrons substantially more readily than the other, which comprises selecting the half-cycles of the arc voltage during which the one of the electrode and the workpiece which emits electrons more readily is negative and controlling the spacing of the electrode from the workpiece in response thereto to maintain the arc length substantially constant.

RICHARD B. STEELE.

References Cited in the file of this patent

UNITED STATES PATENTS

| Number | Name | Date |
|---|---|---|
| 1,897,990 | Smyser | Feb. 14, 1933 |
| 1,930,758 | Laurent | Oct. 17, 1933 |
| 1,982,327 | Smith | Nov. 27, 1934 |
| 2,175,017 | Cockrell | Oct. 3, 1939 |
| 2,282,522 | Kratz | May 12, 1942 |
| 2,357,652 | Haynes | Sept. 5, 1944 |
| 2,360,160 | Pickhaver | Oct. 10, 1944 |
| 2,461,798 | Anderson | Feb. 15, 1949 |
| 2,469,382 | Gayley | May 10, 1949 |
| 2,469,790 | Schmerber | May 10, 1949 |